US009019285B2

(12) United States Patent
Kawahara

(10) Patent No.: US 9,019,285 B2
(45) Date of Patent: Apr. 28, 2015

(54) SEMICONDUCTOR INTEGRATED CIRCUIT DEVICE

(75) Inventor: Shoji Kawahara, Tokyo (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 1237 days.

(21) Appl. No.: 12/526,333

(22) PCT Filed: Feb. 27, 2008

(86) PCT No.: PCT/JP2008/053373
§ 371 (c)(1), (2), (4) Date: Aug. 7, 2009

(87) PCT Pub. No.: WO2008/111396
PCT Pub. Date: Sep. 18, 2008

(65) Prior Publication Data

US 2010/0321398 A1 Dec. 23, 2010

(30) Foreign Application Priority Data

Mar. 15, 2007 (JP) ................................ 2007-066590

(51) Int. Cl.

| | |
|---|---|
| ***G06F 13/14*** | (2006.01) |
| ***G09G 5/39*** | (2006.01) |
| ***G09G 5/393*** | (2006.01) |
| ***G09G 5/395*** | (2006.01) |
| ***G09G 5/397*** | (2006.01) |

(52) U.S. Cl.
CPC .................. *G09G 5/39* (2013.01); *G09G 5/393* (2013.01); *G09G 5/395* (2013.01); *G09G 5/397* (2013.01); *G09G 2330/021* (2013.01); *G09G 2360/128* (2013.01); *G09G 2360/18* (2013.01)

(58) Field of Classification Search
USPC .......................................... 345/519, 520, 522
See application file for complete search history.

(56) References Cited

U.S. PATENT DOCUMENTS 6,005,592 A * 12/1999 Koizumi et al. .............. 345/571
7,127,573 B1 * 10/2006 Strongin et al. .............. 711/158

(Continued)

FOREIGN PATENT DOCUMENTS

JP 5-012387 A 1/1993
JP 6-274410 A 9/1994

(Continued)

OTHER PUBLICATIONS

International Search Report for PCT/JP2008/053373 mailed Apr. 1, 2008.

*Primary Examiner* — Daniel Hajnik
*Assistant Examiner* — Naveed Hasan
(74) *Attorney, Agent, or Firm* — McGinn IP Law Group, PLLC

(57) ABSTRACT

A semiconductor integrated circuit device of the present invention connected to a memory in which display data for a display device is stored, and is adapted to read out the display data from the memory to transfer the same to the display device, the semiconductor integrated circuit device comprising: a display data buffer for holding the display data; a memory controller for prefetching the display data in page-size units of the memory to cause the same to be held by the display data buffer and, upon completing prefetching of one page, closing the page to cause the memory to shift into a power saving mode; and a display device controller for transferring the display data held in the display data buffer to the display device.

19 Claims, 15 Drawing Sheets

(56) References Cited

U.S. PATENT DOCUMENTS

| | | | | |
|---|---|---|---|---|
| 7,805,587 | B1 * | 9/2010 | Van Dyke et al. | 711/202 |
| 8,035,647 | B1 * | 10/2011 | Bittel et al. | 345/531 |
| 8,155,316 | B1 * | 4/2012 | Riach et al. | 380/240 |
| 2006/0047914 | A1 * | 3/2006 | Hofmann et al. | 711/137 |
| 2007/0188506 | A1 * | 8/2007 | Hollevoet et al. | 345/530 |
| 2007/0191007 | A1 * | 8/2007 | Hayek et al. | 455/435.2 |
| 2008/0163368 | A1 * | 7/2008 | Harris et al. | 726/21 |

FOREIGN PATENT DOCUMENTS

| | | | |
|---|---|---|---|
| JP | 8-123953 | | 5/1996 |
| JP | 9-297562 | A | 11/1997 |
| JP | 10-105367 | A | 4/1998 |
| JP | 2003242027 | A | 8/2003 |
| JP | 2006072991 | A | 3/2006 |

* cited by examiner

SEMICONDUCTOR INTEGRATED CIRCUIT DEVICE

The present application is the National Phase of PCT/JP2008/053373, filed Feb. 27, 2008, which is based upon and claims priority from Japanese Patent Application No. 2007-066590 filed on Mar. 15, 2007, which is herein incorporated in its entirety.

TECHNICAL FIELD

The present invention relates to semiconductor integrated circuit devices, and more particularly to a semiconductor integrated circuit device which is suitable for applications to be built into equipment.

BACKGROUND ART

In general, display data for a display device such as an LCD (Liquid Crystal Display) or a CRT (Cathode Ray Tube) is stored in a DRAM which is used as a main storage device or a dedicated storage device for display data. An LCD controller sends a request to a DRAM or a DRAM controller when display data is necessary, and reads out display data from the DRAM to display images and characters on an LCD according to the display data.

However, when it is necessary to allow images to be displayed at a low power consumption, a system which reads out display data from a DRAM in response to a request from the LCD controller is wasteful in terms of power consumption. That is because the operation to open a requested page of the DRAM in response to a request from the LCD controller and to close (precharge) the requested page after necessary display data has been read out is frequently performed. Here, the term "page" refers to the data unit size of a DRAM, which is to be activated by raw activation.

On the other hand, a technique is envisioned in which in order to reduce the number of times to open/close the page of DRAM thereby reducing power consumption, the page is kept in an open state by not closing it. For example, according to the technology disclosed in Patent Document 1 (Japanese Patent Laid-Open No. 10-105367), access is controlled in a state in which a page of a bank of DRAM, which is currently being accessed, is kept open.

Further, in the technology disclosed in Patent Document 1, frame data is set so as to be contained in a page of image memory, and frame data of each of a pair of adjacent rectangular regions is adapted to correspond to an arbitrary bank respectively. Then, the page of any bank which will be accessed in the future is opened in advance so that any bank is successively accessible even when the bank to be accessed is changed.

As described above, in Patent Document 1, by utilizing the parallelism of the banks to be arbitrarily accessed, the rate of data transfer is increased. However, since the page of each bank is kept open and therefore since the DRAM needs to be always kept active, it is not possible to switch the DRAM into another mode, for example, into a power saving mode such as a self-refresh mode, and therefore power consumption is still large.

In order to solve the above described problems, a method is envisioned wherein all of the display data of the LCD is stored in a buffer, which is implemented in the same semiconductor integrated circuit device as the LCD controller and which is made up of an SRAM and a flip-flop other than a DRAM. By doing so, there will be no need to access the DRAM at all. Therefore, it is possible to cause the DRAM to shift into a power saving mode thereby reducing power consumption.

However, the display size of an LCD in recent times has increased and it is not realistic any more to store all the display data in a buffer. For example, in the case of a VGA size LCD having an 18-bit color display, the size of display data exceeds 1 Megabytes. If a buffer for storing all of the aforementioned data is implemented in the same semiconductor integrated circuit device as the LCD controller, the area of the circuit will increase, which is disadvantageous with respect to the manufacturing cost of the semiconductor integrated circuit device. Therefore, if hereafter the display size of the LCD increases, it is necessary to read out the display data from the DRAM, and the problem of power consumption will arise again.

Further, when an image to be displayed is smaller than the display size of an LCD and when the image is enlarged to be displayed on the LCD, it is necessary to read out the display data of the same horizontal line of the LCD for multiple times. Therefore, it is necessary to repeatedly read out the data of the same horizontal line from the DRAM, which will also increase power consumption.

Patent Document 1: Japanese Patent Laid-Open No. 10-105367

DISCLOSURE OF THE INVENTION

Problems to be Solved by the Invention

The present invention has been proposed in view of the above described problems, and its object is to provide a semiconductor integrated circuit device which can efficiently read out display data of a display device from a memory and send the display data to a display device controller at low power consumption while achieving area reduction.

Means for Solving the Problems

The semiconductor integrated circuit device of the present invention is a semiconductor integrated circuit device connected to a memory, in which display data for a display device is stored, and which is adapted to read out the display data from the memory to transfer the same to the display device, the semiconductor integrated circuit device characterized by comprising:

a display data buffer for holding the display data;

a memory controller for prefetching the display data in page-size units of the memory to cause the same to be held by the display data buffer and, upon completing the prefetching of a page, closing the page to cause the memory to shift into a power saving mode; and a display device controller for transferring the display data held in the display data buffer to the display device.

In this case, a dedicated bus for connecting the data transfer between the display device controller and the display data buffer may be included.

Further, a configuration may be such that two display data buffers, each of which has a capacity capable of holding display data of a page size of the memory, are provided as the display data buffer, and the memory controller prefetches display data from the memory into another display data buffer while display data is transferred from one display data buffer to the display device controller.

Further, a configuration may be such that as the display data buffer, one buffer which can hold display data in page size units of memory is provided according to the following number:

(2+(data size of horizontal line of display device)/(page size of memory)+1), and the memory controller prefetches display data from the memory into another display data buffer while display data is transferred from one display data buffer to the display device controller.

According to the present invention, it is possible to read out display data of a display device from a memory and to transfer the display data to the display device controller at low power consumption.

The first reason is that by performing prefetching of display data of the display device in page-size units of memory, it becomes to prevent the issuing of open and close command for any page stored in memory to a minimum of one time which therefore prevents a wasteful exchange of signal and reduces manipulating pages stored in memory, and further by causing the memory to shift into a power saving mode after prefetching, it becomes possible to reduce the power consumption of the memory.

The second reason is that by using a dedicated bus without using the bus used in the main semiconductor integrated circuit device when transferring the display data from the display data buffer to the display device controller, it is made possible for example to stop the clock of the bus used in the main semiconductor circuit device, or stop the power supply while the semiconductor integrated circuit device is operating in a power saving mode, thereby reducing power consumption.

The third reason is that since display data can be prefetched from the memory while display data is transferred to the display device, and while the display data buffer is implemented by a small buffer of a size such as the page-size unit of memory, the space occupied by the display data buffer in the semiconductor integrated circuit device is decreased thereby enabling leak currents and the like to the inhibited.

The fourth reason is that when multiple readouts of data of the same horizontal line of the display device are needed in cases such as enlarged display of an image, the overwriting of display data, which is necessary for the retransfer from the display data buffer to the display device controller, is inhibited and the rereading of data of the same horizontal line from the memory is prevented, thereby enabling to a reduction of unnecessary memory operations, thereby suppressing power consumption.

According to the present invention, the amount of display data of the display device to be prefetched is specified in page-size units of memory. The page-size unit may either be one page or a plurality of pages. That is because, whether the page size unit is either one page or a plurality of pages, arranging the display data amount in page-size units of memory makes it possible to limit the issuance of open and close commands for any page of the memory to a minimum of one time, respectively. As the result, it becomes possible to minimize the opening and closing of the requested page of the memory thereby suppressing power consumption.

Moreover, according to the present invention, the memory is caused to shift into a power saving mode after the end of prefetching. The reason is that since data transfer to the display device controller is performed from the display data buffer after the end of prefetching, the readout of the memory will not be performed until the next prefetching operation. Thus by causing the memory to shift into a power saving mode, it is possible to reduce memory power consumption.

DESCRIPTION OF SYMBOLS

101 MEMORY CONTROLLER
102 DISPLAY DATA BUFFER
103 LCD CONTROLLER
104 CPU
105 DSP
106 CAMERA INTERFACE
107 MAIN BUS
1103 PREFETCH CONTROLLER
1104 DMA CONTROLLER
1105 REQUEST CONTROLLER

BEST MODE FOR CARRYING OUT THE INVENTION

Next, exemplary embodiments will be described in detail with reference to the drawings.

Figure 1:
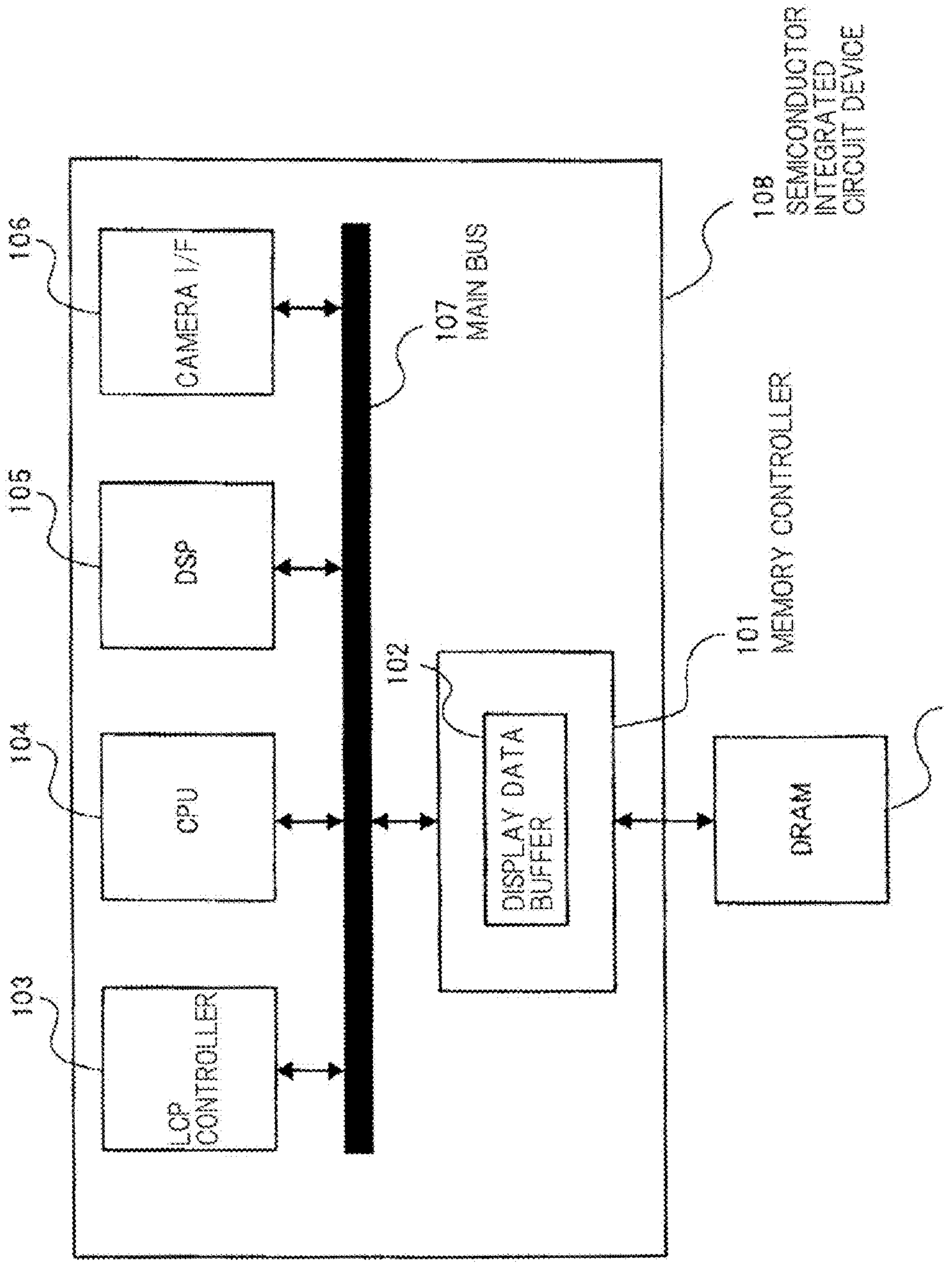
FIG. 1 shows a first exemplary embodiment.

FIG. 1 is a block diagram to show the configuration of an exemplary embodiment.

Semiconductor integrated circuit device 108 of the present exemplary embodiment includes LCD controller (LCDC) 103, and memory controller 101 including display data buffer (Buffer) 102. Although not shown in the figure, LCD controller 103 is connected to an LCD outside the semiconductor integrated circuit device, and transfers display data to the LCD. Besides, semiconductor integrated circuit device 108 also includes CPU 104 and DSP 105, and camera interface (CAMERA I/F) 106. CPU 104, DSP 105, CAMERA I/F 106 and the like may be deleted depending on the use purposes and requirements of the semiconductor integrated circuit device, and also new modules other than the foregoings may be added.

Memory controller 101, LCD controller 103, CPU 104, DSP 105, and CAMERA I/F 106 are connected by main bus 107. Moreover, they are connected to main bus 107 via DRAM 100 and memory controller 101.

DRAM 100 is a large-scale storage device configured for storing display data, and display data buffer 102 is a small-scale storage device made up of an SRAM, a flip-flop, and the like.

Memory controller 101 serves to control data transmission between DRAM 100 and display data buffer 102 and, in the prefetching of LCD display data, allows LCD display data to be prefetched from DRAM 100 and to be stored in display data buffer 102 before receiving a readout request for display data from LCD controller 103. When a readout request for display data is sent over from LCD controller 103, memory controller 101 reads out display data from display data buffer 102 to send it to LCD controller 103.

Herein, the term "prefetching" corresponds to the pre-reading of data in general. Specifically, it means that before LCD controller 103 makes a readout request to memory controller 101 for LCD display data stored in consecutive address regions of DRAM 100, memory controller 101 reads out the LCD display data from DRAM 100 to store it in the display data buffer. At this moment, the address for reading out LCD display data stored in may not be consecutive address regions. For example, the LCD display data may be stored in evenly spaced address regions formed in units of pages of DRAM 100. Alternatively, configuration may be such that the address region to be read out is confirmed with reference to an address map table such as a general transformation between virtual address space and physical address space, and then LCD display data is read out.

Since the operating speeds of DRAMs have increased recently, the time for reading out display data from DRAM 100 is shorter than the time for supplying display data to the LCD. For this reason, rather than reading out display data from the DRAM in accordance with a request by the LCD controller, it is more advantageous as regards power consumption to prefetch necessary display data from DRAM 100 and, after the completion of prefetching to cause the DRAM to shift into a power saving mode such as a self-refresh mode.

Figure 2:
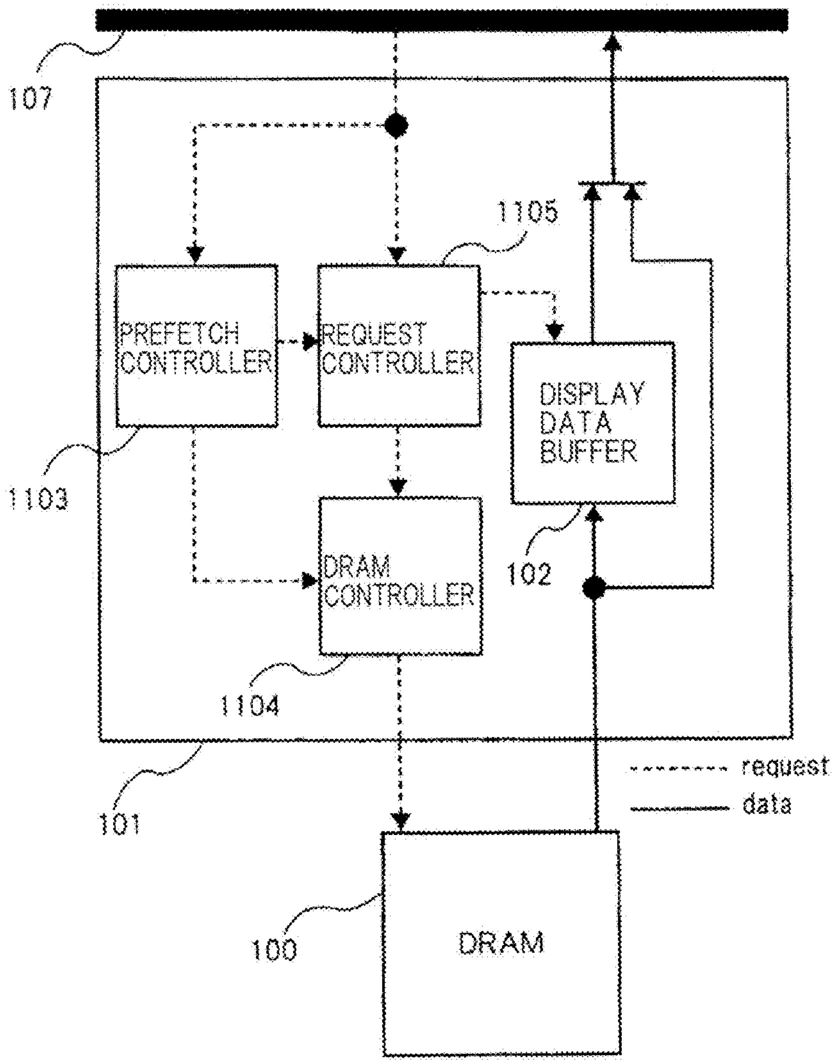
FIG. 2 shows details of the first exemplary embodiment.

FIG. 2 shows in detail the configuration of memory controller 101 in FIG. 1.

Memory controller 101 is made up of, besides display data buffer 102 shown in FIG. 1, prefetch controller 1103, DRAM controller 1104, and request controller. 1105, and is connected with DRAM 100 and main bus 107.

Prefetch controller 1103 performs the starting and ending of prefetch, and creates a DRAM readout request for prefetching. The DRAM readout request for prefetching is issued from prefetch controller 1103 to request controller 1105.

Request controller 1105 arbitrates requests from prefetch controller 1103 and main bus 1106 to issue a request to DRAM controller 1104.

Further, upon reception of a readout request for display data from LCD controller 103 via main bus 107, request controller 1105 reads out display data from display data buffer 102 and sends the display data to main bus 107. DRAM controller 1104 issues a command to DRAM 100 based on the request for DRAM 100 accepted from request controller 1105.

Figure 3:
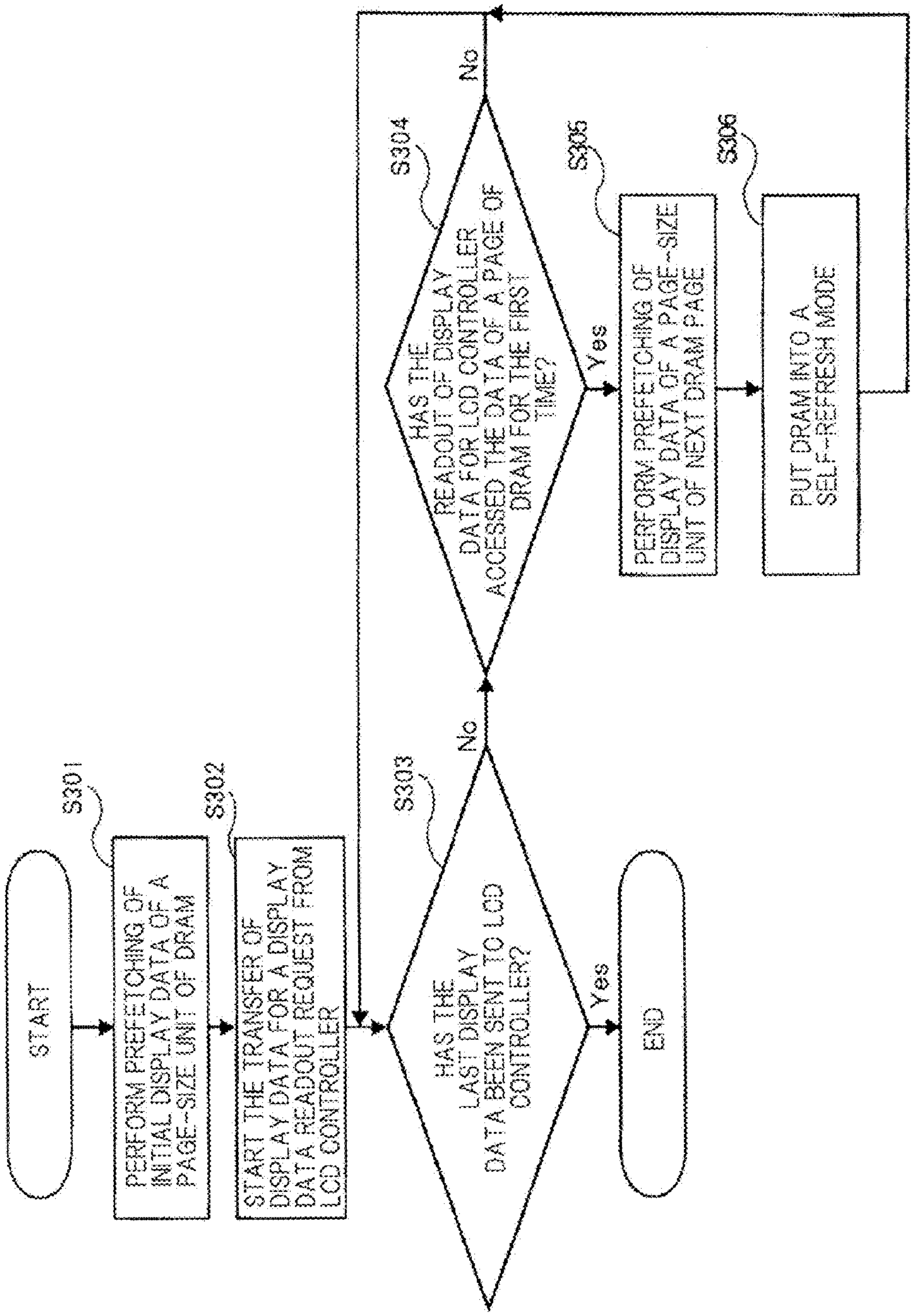
FIG. 3 is a flowchart of the technique of prefetching according to the first exemplary embodiment.

FIG. 3 is a flowchart to show the prefetch operation of display data of LCD. FIG. 3 shows operations until one plane of an LCD has been displayed.

Step S301 in FIG. 3 is an operation immediately after the start of prefetching. Since there is no display data in display data buffer 102 immediately after the start of prefetching, it is necessary to first prefetch display data. The prefetching is performed such that one page full of LCD display data is read out from any bank of DRAM 100 and this data is held in display data buffer 102.

The timing to start prefetching may be notified to prefetch controller 1103 in memory controller 101 by using an interruption or the like by software. Moreover, a technique is also envisioned whereby detection is made through hardware if modules such as CPU 104, DSP 105, and CAMERA I/F 106 have completely stopped sending requests to memory controller 101, and at which time, a signal to start prefetching is sent to prefetch controller 1103.

During this initial prefetching, prefetch controller 1103 needs to send to request controller 1105 a signal for inhibiting the readout of LCD display data from DRAM 1107 and to make request controller 1105 wait until display data buffer 102 is filled with data through prefetching. Alternatively, there is possibly a method whereby in parallel with prefetching, a request from LCD controller 103 is also treated as a normal DRAM readout request and display data is read out from DRAM 1107 to be sent to LCD controller 103.

In either of the above described methods, after the end of the prefetching of a page full of display data stored in DRAM 1107, LCD data is transmitted from display data buffer 102 to LCD controller 103 in regards to a readout request for display data from LCD controller 103. Besides, a method is also envisioned whereby until the prefetching operation is completed, a signal for inhibiting LCD controller 103 from issuing a readout request for display data is sent from prefetch controller 1103.

After step S301, memory controller 101 reads out display data from display data buffer 102 in response to a readout request for display data sent over from LCD controller 103, and starts the transmission of the display data (step S302). It is noted that in the below described steps S303, S304, and S305, although not shown in the figure, when a readout request for display data is sent over to memory controller 101 from LCD controller 103, memory controller 101 performs the transfer of display data to LCD controller 103 in parallel with prefetching.

In step S303, a determination is made whether if the last readout request for LCD display data from LCD controller 103 has been accepted. If memory controller 101 has accepted the last readout request for LCD display data, prefetching is ended since there is no need of further prefetching display data of LCD.

The determination concerning the above described readout request is performed by prefetch controller 1103. The determination method is implemented by comparing the end address, which is set in prefetch controller 1103 in advance, with the address of the readout request for display data sent from LCD controller 103. Setting of the end address in prefetch controller 1103 can be implemented by providing a register which can be set through software and by performing the setting through software. Alternatively, it can also be implemented by configuring end address so that it is fixed in prefetch controller 1103.

In step S304, which is performed when it is determined in step S303 that the last readout request for LCD display data has not been accepted from LCD controller 103, a determination is made as to whether or not to start the prefetching of LCD display data of a next page of LCD display data stored in display data buffer 102.

It is prefetch controller 1103 that performs the determination in step S304. Prefetch controller 1103 starts prefetching LCD display data stored in the next page of DRAM 100 from DRAM 100 (S305) when the memory address of the LCD display data to be transferred to LCD controller 103 becomes the beginning address of a page of DRAM 100.

The technique of starting a prefetch operation may also be configured such that prefetching is started not when the memory address of LCD display data to be transferred to LCD controller 103 becomes the beginning address of the page of DRAM 100, but when LCD display data stored in a page of DRAM 100 is accessed for the first time. Further, the starting point may be at any point such as some midpoint of DRAM 100. Desirably, the timing to start prefetching is set such that sufficient time is ensured in which prefetching of the page is completed before the transfer of display data to LCD controller 103 is started.

When the prefetching of LCD display data from DRAM 100 is completed, DRAM 100 is put into a self-refresh mode (step S306). This allows suppressing the power consumption of DRAM 100 to a low level.

The means of causing a shift into a self-refresh mode can be implemented by a method in which prefetch controller 1103 transmits a request signal for transition to a self-refresh mode, and in which DRAM controller 1104 which receives the request signal, issues a self-refresh command to DRAM 1107. Alternatively, a method is also envisioned in which request controller 1105 transmits a signal for requesting a transition into a self-refresh mode to DRAM controller 1104 at the moment when a display data readout request for prefetching from prefetch controller 1103 becomes non-existent.

If a memory request is sent over to memory controller 101 from any master module (for example, CPU 104 etc.), it is necessary to cause DRAM 100 to return from a self-refresh mode. This is particularly useful in a state in which supplying of a clock or a power source is not performed in the present exemplary embodiment, where no modules other than DRAM 100, memory controller 101, LCD controller 103, and main bus 107 are operating. Examples of such an operation include for example the standby state of a portable phone.

Figure 4:
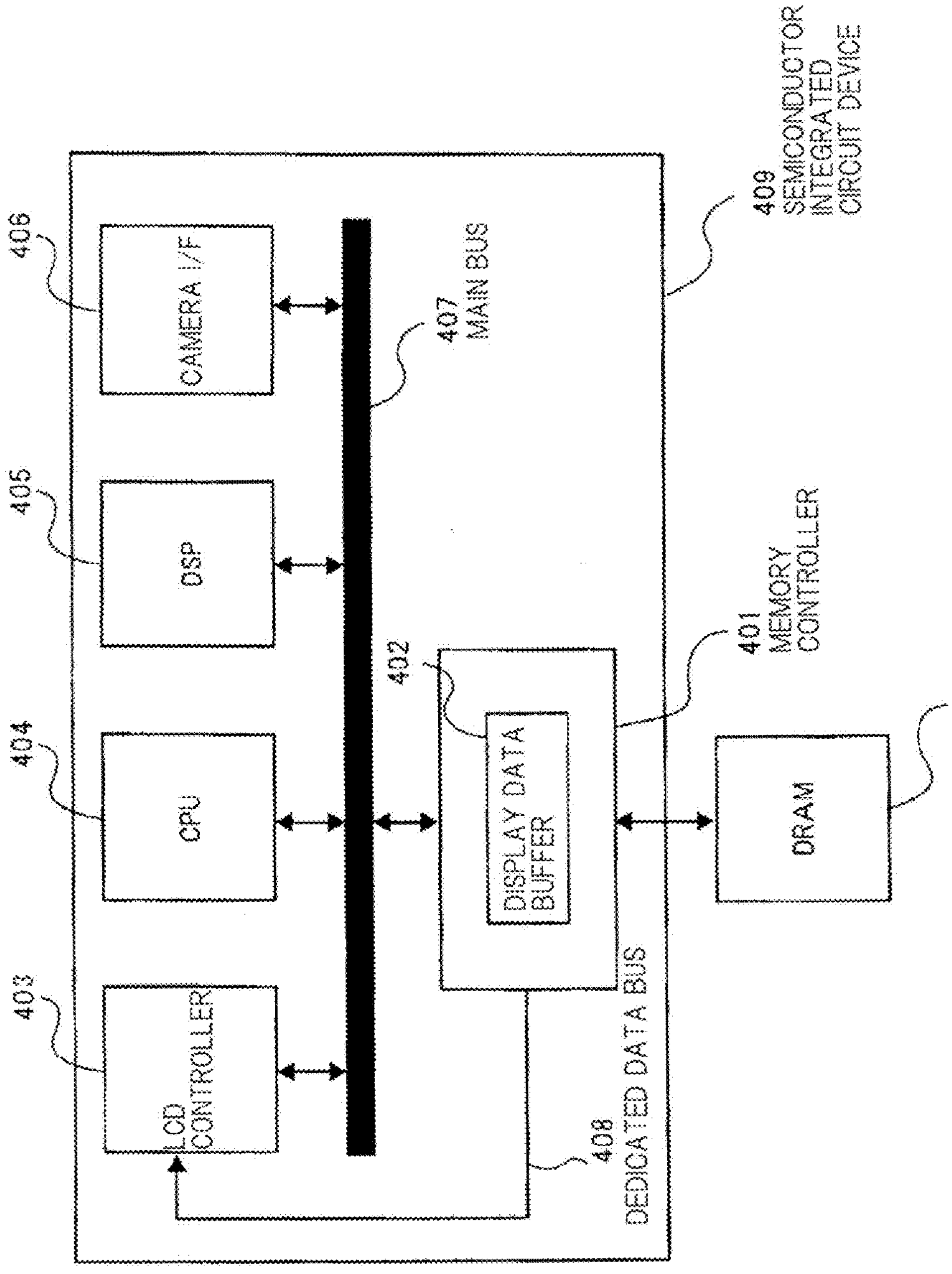
FIG. 4 shows a second exemplary embodiment.

FIG. 4 is a block diagram to show the configuration of the semiconductor integrated circuit device relating to a second exemplary embodiment.

Semiconductor integrated circuit device 409 includes LCD controller 403, and memory controller 401 including display data buffer 402. Though not shown in the figure, LCD controller 403 is connected to an LCD outside the semiconductor integrated circuit device and transfers display data to the LCD. Besides, semiconductor integrated circuit device 409 also includes CPU 404, DSP 405, and CAMERA I/F 406.

CPU 404, DSP 405, CAMERA I/F 406, and the like may be deleted depending on use purposes and requirements of semiconductor integrated circuit device 409, and a new module may be added.

Memory controller 401, LCD controller 403, CPU 404, DSP 405, and CAMERA I/F 406 are connected by main bus 407. Moreover, memory controller 401 and LCD controller 403 are also connected by dedicated data bus 408.

Figure 5:
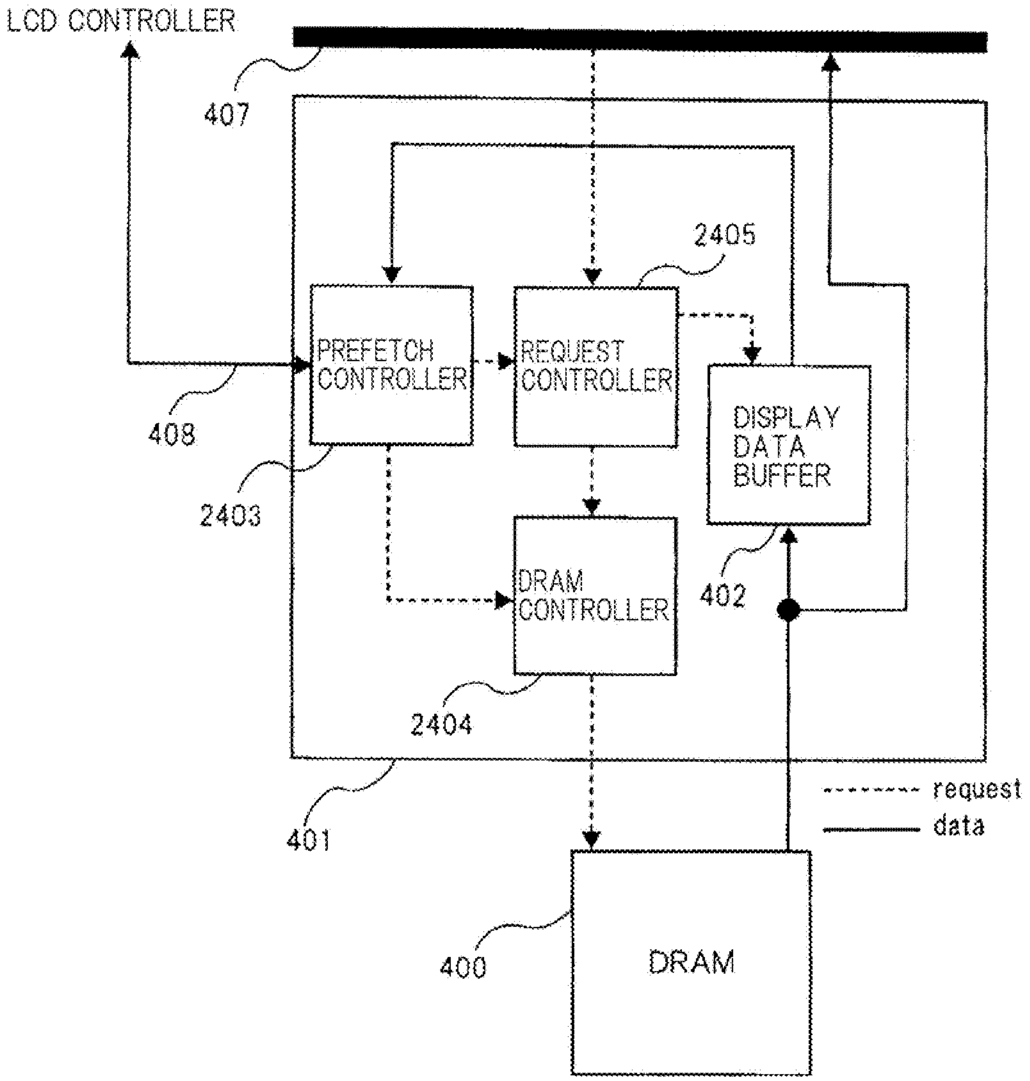
FIG. 5 shows details of the second exemplary embodiment.

FIG. 5 shows in detail the configuration of memory controller 401 shown in FIG. 4.

Memory controller 401 is made up of, besides display data buffer 402 shown in FIG. 4, prefetch controller 2403, DRAM controller 2404, and request controller 2405, and is connected with DRAM 400 and main bus 407.

The configuration of display data buffer 402, prefetch controller 2403, DRAM controller 2404, and request controller 2405 is similar to that of display data buffer 102, prefetch controller 1103, DRAM controller 1104, and request controller 1105 shown in FIG. 2, and is different from the configuration shown in FIG. 2 in that prefetch controller 2403 and LCD controller 403 are connected by dedicated data bus 408, and in that display data buffer 2402 and prefetch controller 2403 are connected by a data line.

Figure 6:
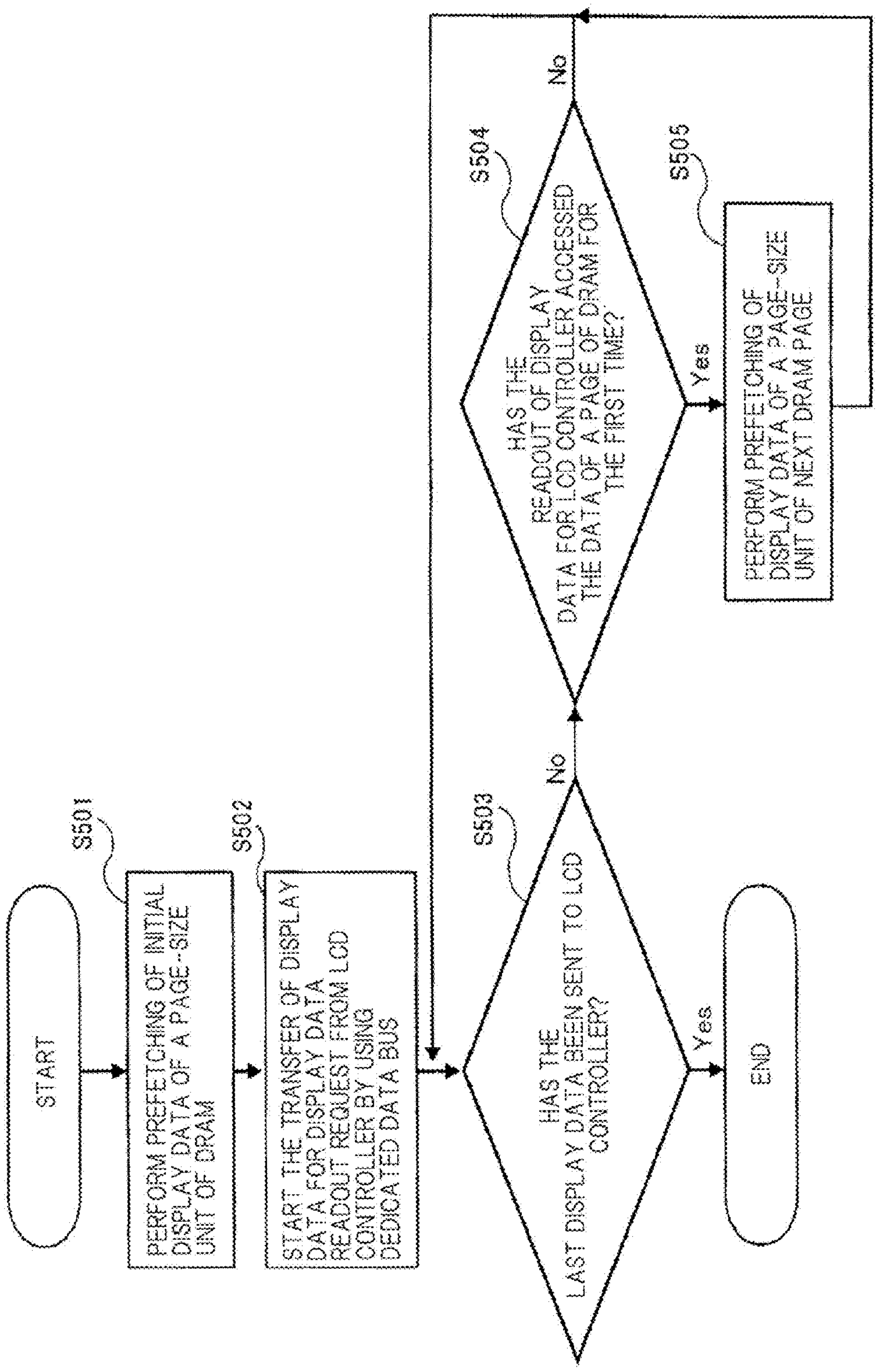
FIG. 6 is a flowchart of the technique of prefetching according to the second exemplary embodiment.
Figure 7:
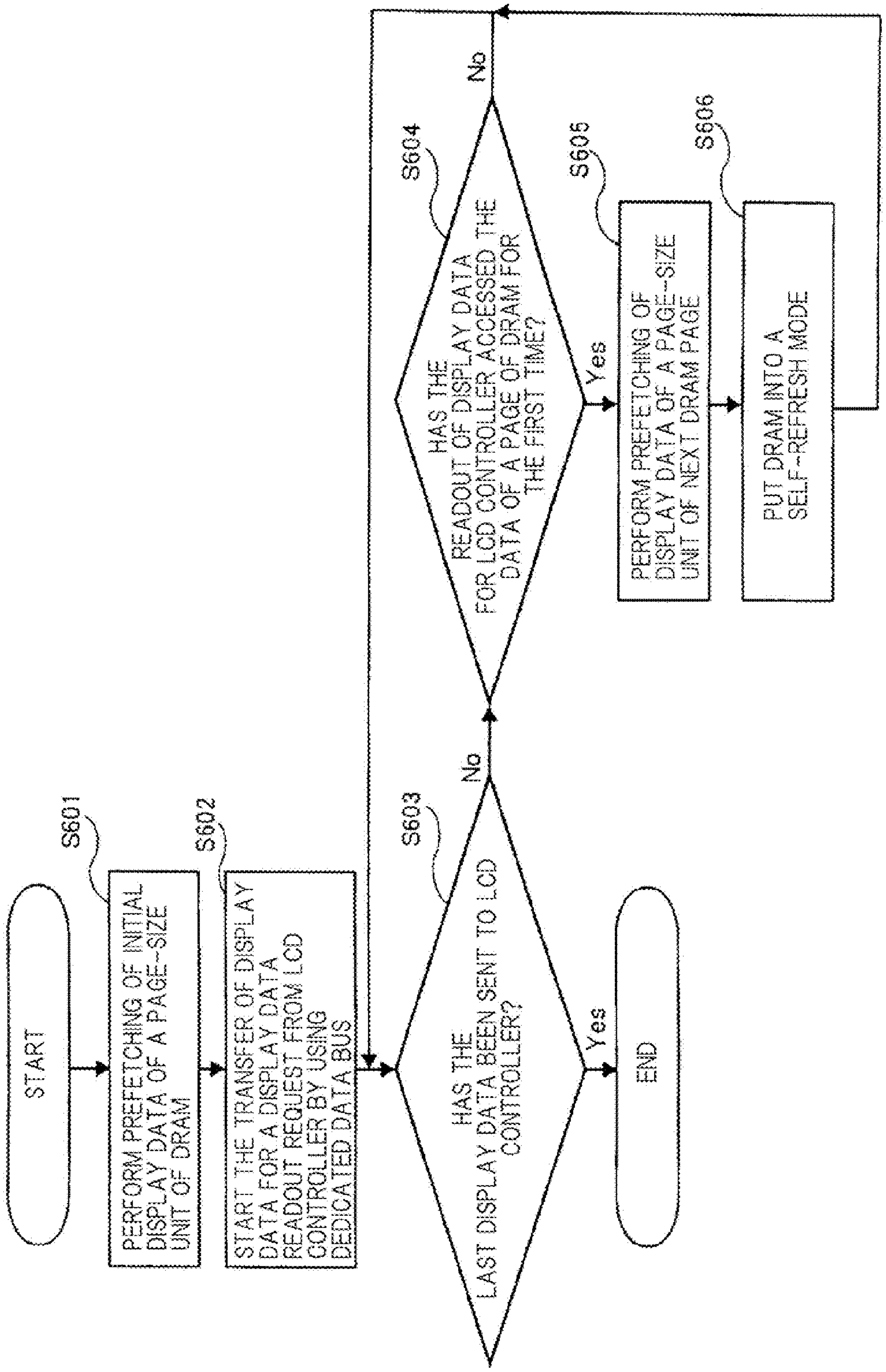
FIG. 7 is a flowchart of the technique of prefetching according to the second exemplary embodiment.

FIGS. 6 and 7 are flowcharts to show different techniques for the prefetching of LCD display data, which are performed by using the second exemplary embodiment.

Steps S501, and S503 to S505 in FIG. 6 are similar to steps S301, and S303 to S305 shown in FIG. 3, and steps S601, and S603 to S606 shown in FIG. 7 are similar to steps S301, and S303 to S306 shown in FIG. 3.

Step S502 in FIG. 6 and step S602 in FIG. 7 are both configured such that the request for display data of LCD and the data transfer between LCD controller 403 and memory controller 401 utilize dedicated data bus 408, and are different in that point from the technique of prefetching shown in FIG. 3.

The exchange of display data using dedicated data bus 408 is useful in a state in which major modules other than an LCD, LCD controller 403, DRAM 400, and memory controller 401 are not operating, such as the standby state of a portable phone.

When in a standby state, by stopping the supply of a clock or a power source for CPU 404, DSP 405, and CAMERA I/F 406 in FIG. 4, and at the same time by stopping the supply of a clock or a power source to main bus 407 as well, it is made possible to reducing power consumption is made possible.

When there is no dedicated data bus 408, it is not possible to stop the supply of a clock or a power source to main bus 407. Main bus 407 will have a larger area than dedicated data bus 408 because it is connected to more modules compared to dedicated data bus 408. Therefore, in a standby state, performing the exchange of LCD display data not by using main bus 407 but by using dedicated data bus 408 is advantageous in terms of power consumption. Moreover, the clock rate of dedicated data bus 408 may be of a level which is sufficient for the supply of LCD display data, which generally means that the rate is lower than that of main bus 407. Thus, from the viewpoint of clock rate as well, using dedicated bus 408 is advantageous for power consumption.

Figure 8:
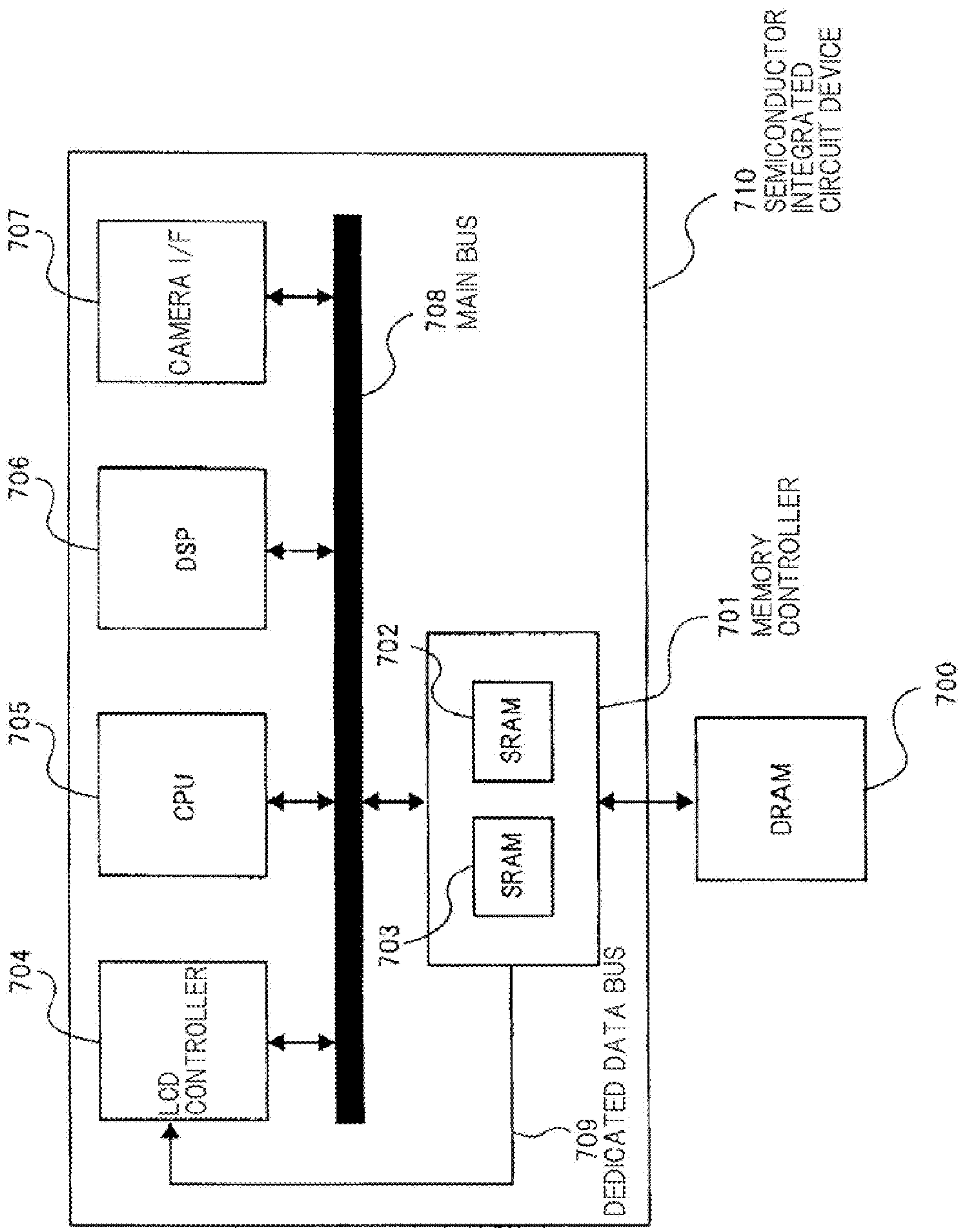
FIG. 8 shows a third exemplary embodiment.

FIG. 8 is a block diagram to show the configuration of semiconductor integrated circuit device 710 relating to a third exemplary embodiment.

Semiconductor integrated circuit device 710 includes LCD controller 704 and memory controller 701. Memory controller 701 includes SRAMs 702 and 703 which are used as the display data buffer, and each of SRAMs 702 and 703 has a data capacity in page-size units of DRAM. From the viewpoint of the area of the display data buffer, SRAMs 702 and 703 used for the display data buffer are desirably single-port SRAMs. Of course, this buffer may be implemented by a flip-flop or the like. Moreover, if there is no particular limitation on the write/read port, one buffer of the same capacity may be used.

Although not shown in FIG. 8, LCD controller 704 is connected to an LCD outside semiconductor integrated circuit device 710 to transfer display data to the LCD. Further, semiconductor integrated circuit device 710 also includes CPU 705, DSP 706, and CAMERA I/F 707. CPU 705, DSP 706, CAMERA I/F 707, and the like may be deleted depending on the use purposes and requirements of semiconductor integrated circuit device 710, or a new module may be added.

Memory controller 701, LCD controller 704, CPU 705, DSP 706, and CAMERA I/F 707 are connected by main bus 708. Moreover, memory controller 701 and LCD controller 704 are also connected by dedicated data bus 709. This dedicated data bus 709 is not a requirement, and in that case, the exchanges of requests and data between LCD controller 704 and memory controller 701 are performed necessarily via main bus 708.

In the prefetching of LCD display data, memory controller 701 allows LCD display data to be prefetched from DRAM 700 and to be stored in SRAM 702 or 703 before receiving a readout request for display data from LCD controller 704. When a readout request for display data is sent over from LCD controller 704, memory controller 701 reads out display data from SRAM 702 or 703 and sends it to LCD controller 704. At this moment, the exchanges of readout request and display data are performed through dedicated data bus 709. If semiconductor integrated circuit device 710 does not include dedicated data bus 709, main bus 708 is used to perform exchanges of readout request and display data.

Figure 9:
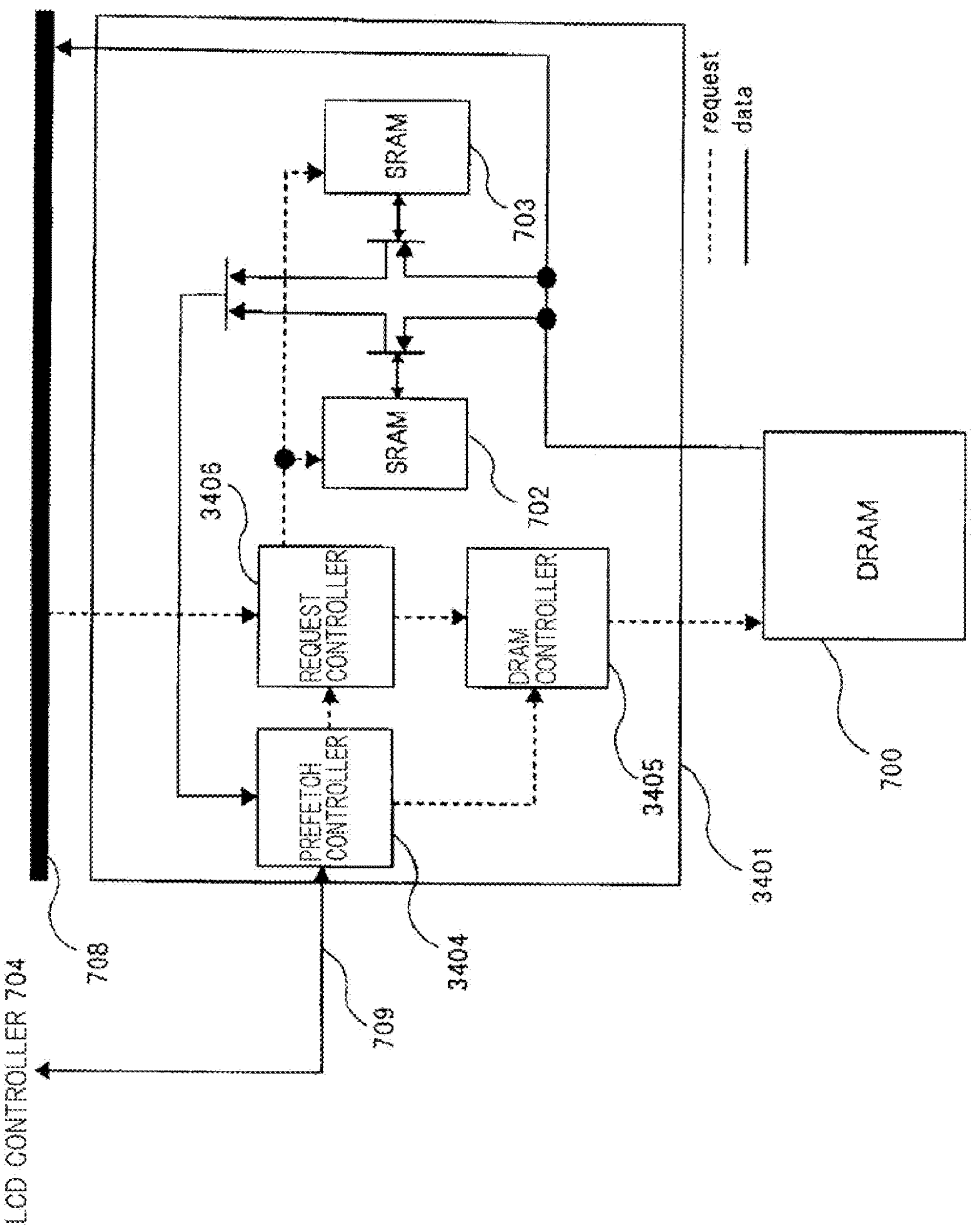
FIG. 9 shows details of the third exemplary embodiment.

FIG. 9 shows in detail the configuration of memory controller 701 shown in FIG. 8.

Memory controller 701 is made up of, besides SRAMs 702 and 703 shown in FIG. 8, prefetch controller 3404, DRAM controller 3405, and request controller 3406, and is connected with DRAM 700 and main bus 708. Further, prefetch controller 3404 is connected with LCD controller 403 via dedicated data bus 408.

Memory controller 701 which is configured as described above has the same configuration as that of memory controller 401 shown in FIG. 5 except that the display data buffer is made up of two SRAMs 702 and 703. The selection of a display data buffer for storing display data during prefetching is performed by prefetch controller 3404, which sends that information to request controller 3406.

Figure 10:
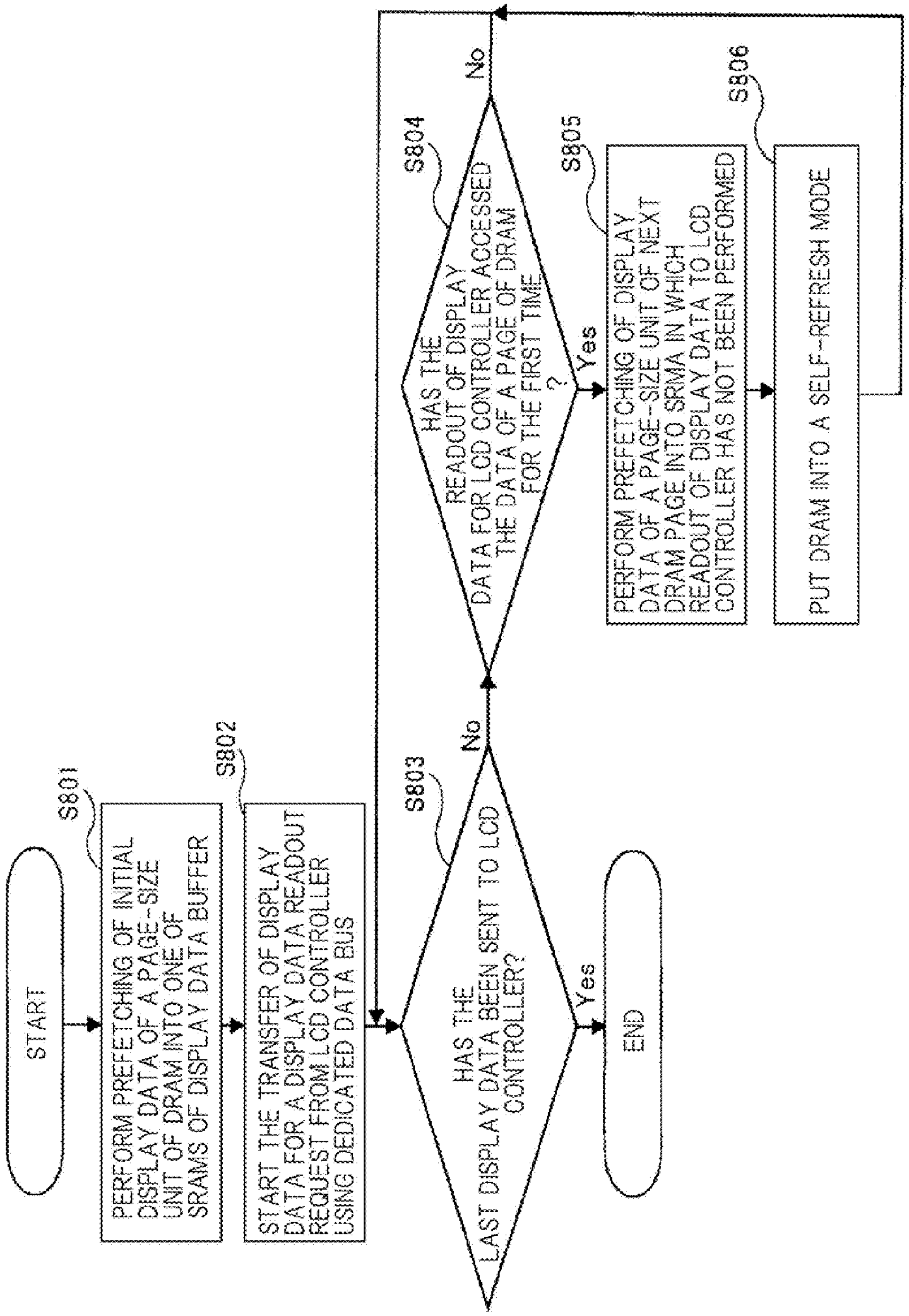
FIG. 10 is a flowchart of the technique of prefetching according to the third exemplary embodiment.

FIG. 10 is a flowchart to show the operation of prefetching display data of LCD according to the third exemplary embodiment. In FIG. 10, operations are shown until one plane of LCD has been displayed.

Step S801 of FIG. 10 shows an operation of semiconductor integrated circuit device 710 immediately after the start of prefetching. Since there is no display data in SRAM 702 or 703 immediately after the start of prefetching, it is first necessary to prefetch display data. At this moment, though the SRAM for performing the prefetching may be either SRAM 702 or 703, now suppose that by way of explanation, prefetching is first performed in SRAM 702.

After step S801, upon acceptance of a readout request for display data sent over from LCD controller 704, memory controller 701, in response to that, starts the transmission of LCD display data from display data buffer 702 (step S802). It is noted that, in below described steps S803 to S806, though not shown in the figure, if a readout request for display data from LCD controller 704 is sent over to memory controller 701, memory controller 701 performs the transfer of the display data to LCD controller 704 in parallel with the prefetching.

In step S803, a determination is made whether LCD controller 704 has accepted a readout request for the last display data. If memory controller 701 has accepted a readout request for the last display data, there is no need of further prefetching display data of LCD and therefore the process is ended.

In step S804, a determination is made whether or not to start the prefetching of display data of a next DRAM page of the data stored in either of SRAM 702 and SRAM 703. If the memory address of display data to be transferred to LCD controller 704 is the beginning of the DRAM page, the prefetching of LCD display data stored in the page next to the requested page of DRAM 700 is started from DRAM 700 (step S805).

The above described technique to start prefetching may be configured such that prefetching is started not when the memory address becomes the beginning of a page of DRAM 700, but when the display data of a page of DRAM 700 is accessed for the first time. If prefetching is completed, DRAM 700 is put into a self-refresh mode thereby reducing power consumption (step S806). If the condition of step S804 is false, memory controller 701 keeps on performing the transfer of display data in response to a readout request for display data incoming from LCD controller 704.

The process up to step S806 will be specifically described below.

Suppose LCD display data is stored in SRAM 702 as a result of step S801. The transfer of LCD display data to the LCD is started by step S802. While, at step S803, the end of display data is checked, suppose this result is false, that is, the display data currently being sent to LCD controller 704 is not the last display data.

Here, since the readout of LCD display data stored in SRAM 702 is performed for the first time, the condition at step S804 becomes true. Then, at step S805, the page next to the page of DRAM 700 corresponding to the display data stored in SRAM 702 is opened thereby starting the prefetching of LCD display data into SRAM 703. Concurrently during this period, when a readout request of display data has arrived from LCD controller 704, memory controller 701 transmits display data of display data buffer 702 to LCD controller 704.

Hereafter, if the prefetching display data in the amount corresponding to a page-size unit of DRAM for readout data buffer 703 has been completed, the DRAM page is closed and at step S806, the DRAM is put into a self-refresh mode. Hereafter, the transfer of display data to LCD controller 704 is repeated (steps S803 to S804).

Suppose the readout of LCD display data comes closer to the data of SRAM 703 from the data of SRAM 702. In this case, since access is made for the first time to display data stored in SRAM 703 in page-size units of DRAM, the condition at step S804 becomes true. For this reason, according to S805, the prefetching of DRAM page readout data next to the readout data of the DRAM page stored in readout data buffer 703 is performed for readout buffer 702. After the end of the prefetching, DRAM 700 is put into a self-refresh mode. The above described series of operations are performed until the condition at step S803 becomes true.

Figure 11:
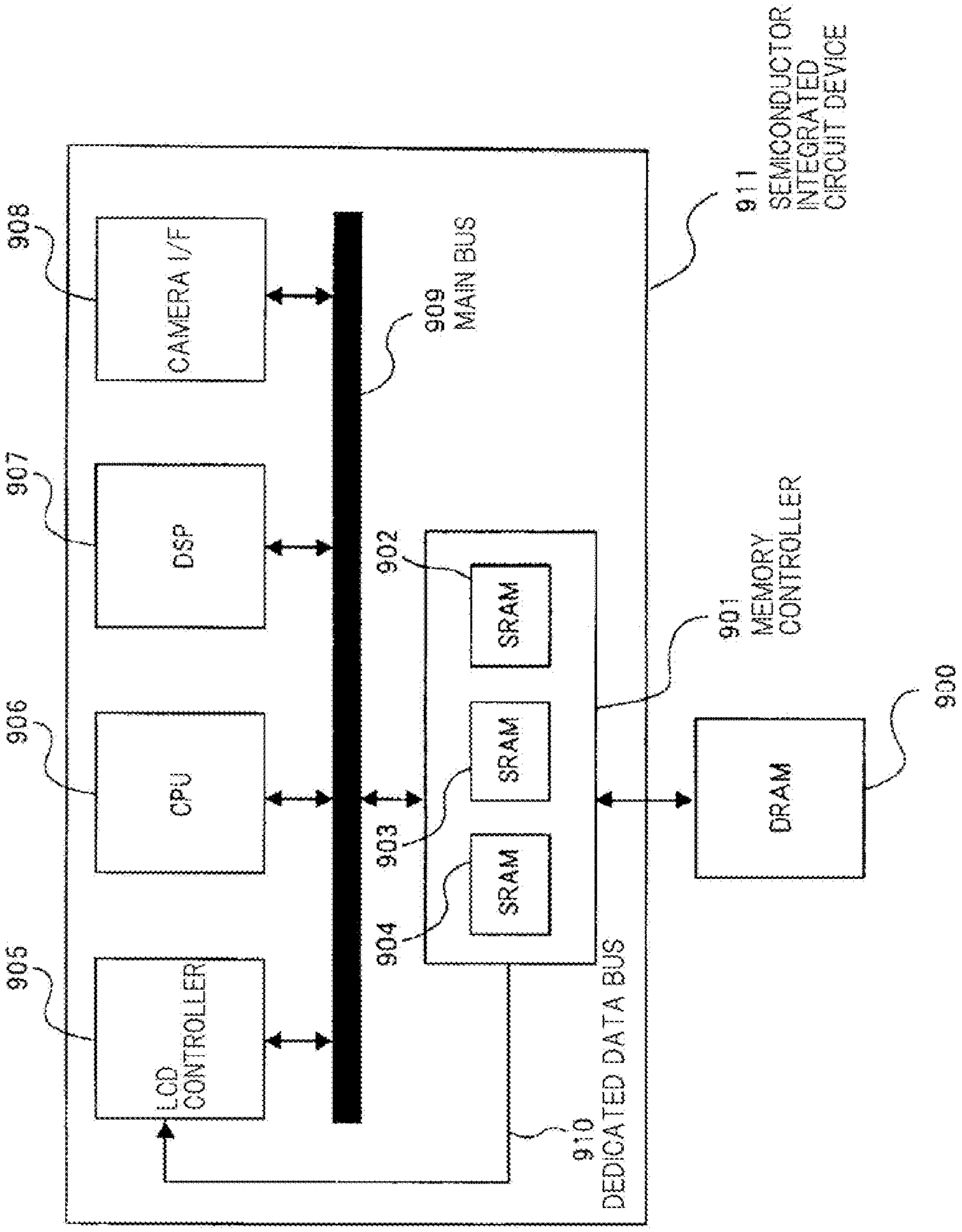
FIG. 11 shows a fourth exemplary embodiment.

FIG. 11 is a block diagram to show the configuration of semiconductor integrated circuit device 911 relating to a fourth exemplary embodiment.

Semiconductor integrated circuit device 911 includes LCD controller 905 and memory controller 901. Memory controller 901 includes SRAMs 902, 903, and 904 as a display data buffer. Although not shown in the figure, LCD controller 905 is connected to an LCD outside semiconductor integrated circuit device 911 to transfer the LCD display data to the LCD. Besides, semiconductor integrated circuit device 911 also includes CPU 906, DSP 907, and CAMERA I/F 908. CPU 906, DSP 907, CAMERA I/F 908, and the like may be deleted depending on use purposes and requirements of the semiconductor integrated circuit device, or a new module may be added.

Memory controller 901, LCD controller 905, CPU 906, DSP 907, and CAMERA I/F 908 are connected by main bus 909. Moreover, memory controller 901 and LCD controller 905 are also connected by dedicated data bus 910.

In the prefetching of LCD display data, memory controller 901 allows display data to be prefetched from DRAM 900 and to be stored in any of SRAMs 902, 903, and 904 before receiving a readout request for display data from LCD controller 905. When a readout request for display data has been sent over from LCD controller 905, memory controller 901 reads out display data from display data buffer 402 and sends the display data to LCD controller 905.

According to the fourth exemplary embodiment, it is possible to prevent reprefetching due to the overwriting of display data, which may take place during multiple readouts of display data in the same horizontal line of LCD, which is stored across multiple pages of DRAM 900. By preparing display data buffers in the number, (the number of DRAM pages spanned by the horizontal line display data+1), or in a buffer having the same capacity as the foregoing, it is possible to prevent reprefetching.

Figure 12:
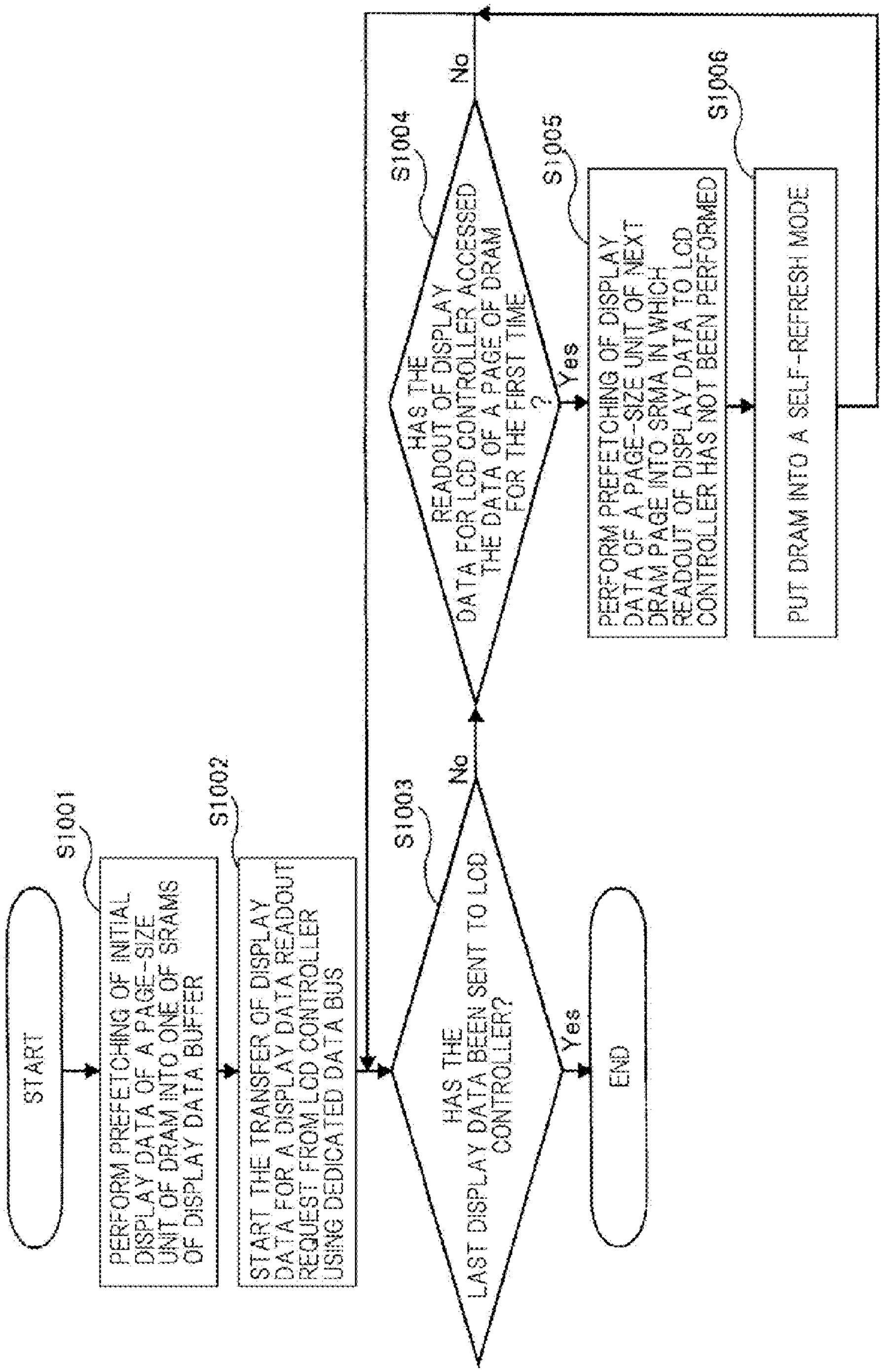
FIG. 12 is a flowchart of the technique of prefetching according to the fourth exemplary embodiment.

FIG. 12 is a flowchart to show the prefetch operation of display data of LCD according to the fourth exemplary embodiment. In FIG. 12, operations are shown until one plane of LCD has been displayed. Steps S1001 to S1004 and S1006 in FIG. 12 are similar to steps S801 to S804 and S806 shown in FIG. 10, and the techniques of prefetching at step S1005 are different from each other.

Figure 13:
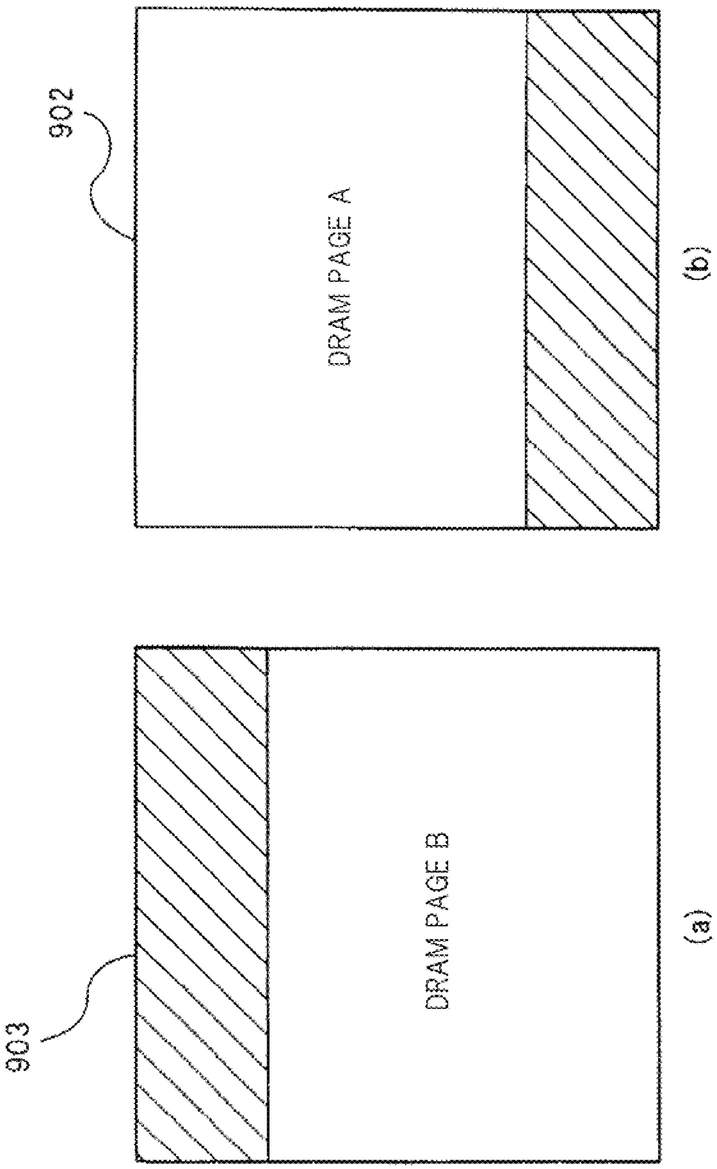
FIG. 13 shows a status of the display data buffer (in the case of two display data buffers) in the fourth exemplary embodiment.
Figure 14:
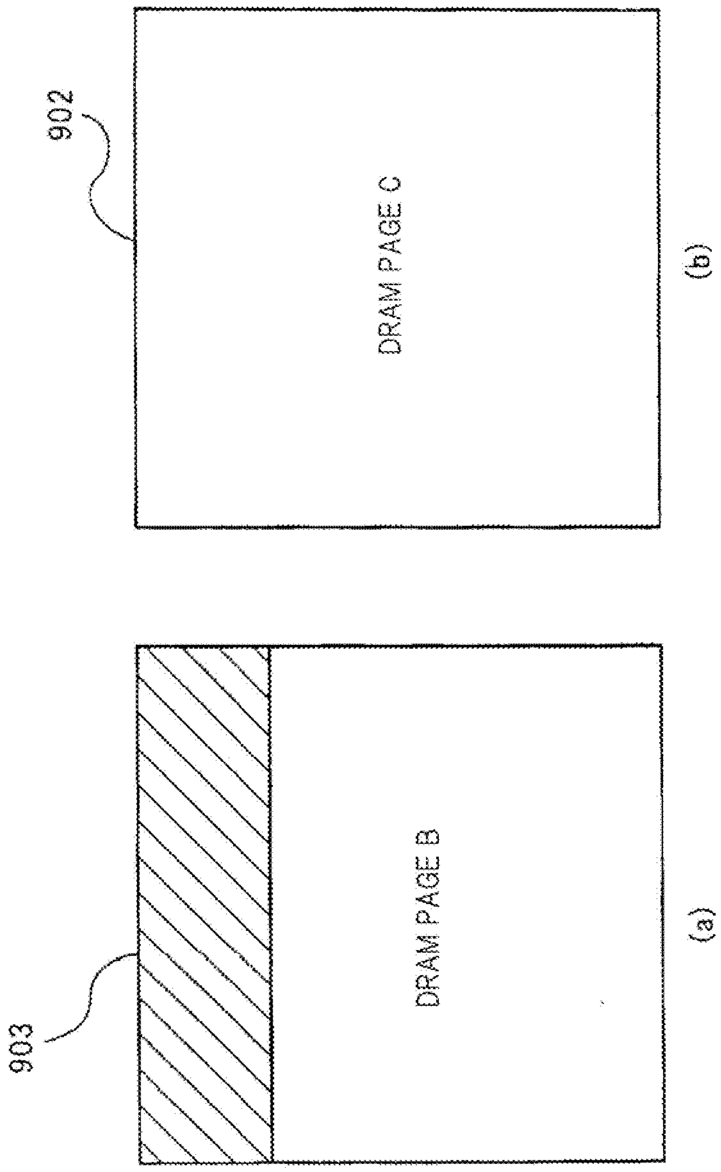
FIG. 14 shows the status of the display data buffer (in the case of two display data buffers) in the fourth exemplary embodiment.
Figure 15:
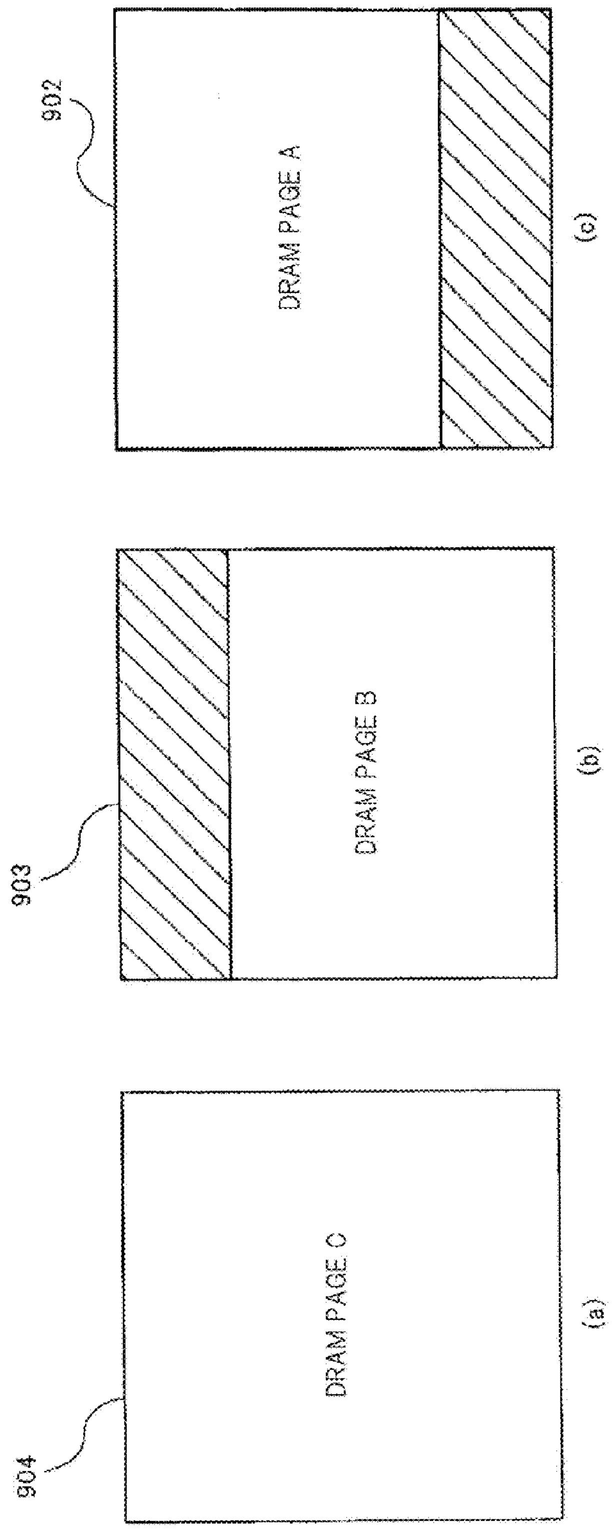
FIG. 15 shows the status of the display data buffer (in the case of three display data buffers) in the fourth exemplary embodiment.

FIGS. 13 to 15 explain the data transfer from DRAM 900 to each SRAM in the present exemplary embodiment, and hereafter the prefetch operation of the present exemplary embodiment will be specifically described with reference to FIG. 12 and FIGS. 13 to 15.

Suppose the screen display size of the LCD is VGA (vertically 640 lines and horizontally 480 lines) and the display color thereof is 18-bit color (about 260000 colors). Here, suppose a QVGA size image (vertically 320 lines and horizontally 240 lines) is to be enlarged into a VGA size and displayed. In order to enlarge a QVGA image and display it as a VGA image, it is necessary to transfer the data of one horizontal line of QVGA twice for an LCD. When the display color is also supposed to be 18-bit color, the data size of one horizontal line of QVGA is 540 Bytes.

Moreover, suppose the data size of one page of DRAM is 1 Kbytes, that is, prefetching is performed in units of 1 Kbytes. In conjunction with that, the data capacity of each of SRAMs 902, 903, and 904 is also supposed to be 1 Kbytes.

Based on the above described conditions, the steps shown in FIG. 12 will be executed. Here, it is supposed that the states of the data in SRAMs 903 and 902 have become as shown in FIGS. 13(*a*) and 13(*b*). There is display data of page A of DRAM 900 in SRAM 902, and display data of page B of DRAM 900 in SRAM 903. Further, suppose page C of the DRAM is present as LCD display data which has not been fetched into either of the SRAMs.

Suppose the address order of LCD display data is such that page B is next to page A, and page C is next to page B. Further, suppose that the shaded portions in FIGS. 13(*a*) and 13(*b*) are display data of the horizontal line to be transmitted to LCD controller 905 this time. That is, the above described display data of the horizontal line is data spanning across page A and page B, and the display data of the horizontal line is going to be sent twice to LCD controller 905.

First, a first transfer of display data of horizontal line to LCD controller 905 is performed. At this moment, since the display data of horizontal line spans across page A and page B of DRAM 900, prefetching of the display data in page C of the DRAM is started at the same time when the readout of page B is started (the condition of step S1004 in FIG. 12 is true, and thereafter step S1005 is executed).

Here, if there are only two SRAMs as shown in FIG. 8, the display data of page C of the DRAM is prefetched into display data buffer 902 as shown in FIGS. 14(*a*) and 14(*b*). Then, at the time of a second readout of the display data of horizontal line, the requested display data of display data buffer 902 has been overwritten by the display data of page C, and therefore is not present in display data buffer 902. Therefore, it is necessary to read out again the display data of page A from DRAM 900. Such an action requires forcing DRAM 900 to return from a self-refresh mode, opening page A to read out the same data again and thereafter closing it, which will increase power consumption.

In the present exemplary embodiment, since the SRAM as the display data buffer is made up of three units, the problem as described above will not arise. When there are three SRAMs as the display data buffer, as in the present exemplary embodiment, since the display data of page C of the DRAM can be prefetched into display data buffer 904, as shown in FIGS. 15(*a*) to 15(*c*), there is no need to overwrite display data of page A stored in display data buffer 902. As the result, it is possible to prevent the rereading of display data from DRAM 900, thereby suppressing an increase in power consumption.

The above described number of SRAMs is determined as follows: (2+(data size of LCD horizontal line)/(DRAM page size)+1), where, constant 2 is a minimum number as a multiple configuration, constant 1 is a minimum number as a reserve, and (data size of LCD horizontal line)/(DRAM page size) is a variable element, and in accordance with the variable element, the number of display data buffers is increased. In the case of the present exemplary embodiment, the value of (data size of LCD horizontal line)/(DRAM page size) is less than one and therefore is rounded down, and thus a three-unit configuration is adopted.

For example, when the data size of horizontal line is 1080 Kbytes for 1 Kbyte of DRAM page size, by using (2+(data size of LCD horizontal line)/(DRAM page size)+1), that is, four display data buffers, or one buffer whose data size has the same capacity, preventing overwriting of the display data of the LCD is made possible.

It is noted that in each exemplary embodiment described above, whereas the storage device that stores display data is implemented by a DRAM, other storage devices may be envisioned. By prefetching display data from the storage device in units of pages or blocks specified in the storage device, and by causing the storage device to shift into a power saving mode after the end of prefetching, it becomes possible to reduce power consumption. Examples of the storage device other than DRAM include for example NAND flash memories. In the case of NAND flash memory, by stopping the operation of the charge pump after the prefetching in units of pages has been completed, it reducing power consumption is made possible.

Although, so far the present invention has been described with reference to exemplary embodiments, the present invention will not be limited to the above described exemplary embodiments. The configuration and details of the present invention are subject to modifications which are understandable to a person skilled in the art within the scope of the present invention.

The invention claimed is:

1. A semiconductor integrated circuit device connected to a memory, in which display data for a display device is stored, and which is adapted to read out said display data from said memory to transfer the same to said display device, said semiconductor integrated circuit device comprising:
- a display data buffer for holding said display data;
- a memory controller for prefetching said display data in page-size units of said memory to cause said display data to be held by said display data buffer and, upon completion of the prefetching of a page, closing said page to cause said memory to shift into a power saving mode; and a display device controller for transferring the display data held in said display data buffer to said display device; and a dedicated bus for enabling a data transfer between the display device controller and the display data buffer;

wherein the display buffer is provided according to a following number of memory units: (2+(data size of horizontal line of display device)/(page size of memory) +1), wherein the (data size of horizontal line of display device)>=(page size of memory).

2. The semiconductor integrated circuit device according to claim 1, wherein said display data buffer comprises a plurality of display data buffers, wherein each of said plurality of display data buffers has a capacity capable of holding display data of a page size of memory, and wherein the memory controller prefetches display data from the memory into another display data buffer while display data is transferred from one display data buffer to the display device controller.

3. The semiconductor integrated circuit device according to claim 1, wherein the memory controller prefetches display data from the memory into another display data buffer while display data is transferred from one display data buffer to the display device controller.

4. The semiconductor integrated circuit device according to claim 1, wherein at least one of said page-size units comprises a single page.

5. The semiconductor integrated circuit device according to claim 1, wherein at least one of said page-size units comprises a plurality of pages.

6. The semiconductor integrated circuit device according to claim 1, wherein said memory controller comprises a request controller connected to said display data buffer.

7. The semiconductor integrated circuit device according to claim 6, wherein said memory controller further comprises a prefetch controller which is connected to said request controller.

8. The semiconductor integrated circuit device according to claim 7, wherein said memory controller further comprises a Dynamic Random Access Memory (DRAM) controller connected to said prefetch controller and connected to said request controller.

9. The semiconductor integrated device according to claim 7, wherein said prefetch controller performs a prefetch operation and creates a readout request for prefetching, and wherein said readout request for prefetching is issued to said request controller.

10. The semiconductor integrated device according to claim 7, wherein said prefetch controller is directly connected to said display data buffer.

11. The semiconductor integrated device according to claim 8, wherein said request controller arbitrates requests from said prefetch controller and a main bus, in order to issue a request to said DRAM controller.

12. The semiconductor integrated device according to claim 8, wherein, upon reception of a readout, said request controller reads out display data from said display data buffer, and wherein said DRAM controller issues a command based on an accepted request from said request controller.

13. The semiconductor integrated circuit device according to claim 1, further comprising:

a Liquid Crystal Display (LCD) controller;

a Central Processing Unit (CPU);

a Digital Signal Processor (DSP);

a Camera Interface (CAMERA I/F); and a main bus which connects said LCD controller, said CPU, said DSP, said CAMERA I/F and said memory controller, wherein a clock rate of said dedicated bus is lower than a clock rate of said main bus.

14. The semiconductor integrated circuit device according to claim 1, wherein a clock rate of said dedicated bus is at a level which enables a supply of data.

15. The semiconductor integrated circuit device according to claim 1, further comprising a main bus connected to said memory controller, wherein a clock rate of said dedicated bus is less than a clock rate of said main bus.

16. The semiconductor integrated circuit device according to claim 13, wherein said dedicated bus enables said data transfer between the display device controller and the display data buffer independently of said main bus.

17. The semiconductor integrated circuit device according to claim 1, further comprising a main bus connected to said memory controller, wherein said dedicated bus enables said data transfer between the display device controller and the display data buffer independently of said main bus.

18. The semiconductor integrated circuit device according to claim 1, further comprising a main bus connected to said memory controller, wherein a clock rate of said dedicated bus is different than a clock rate of said main bus.

19. A semiconductor integrated circuit device comprising:

a display data buffer which holds display data; and a memory controller which prefetches said display data in a page-size unit; and a dedicated bus for enabling a data transfer between a display device controller and the display data buffer, wherein upon completion of a prefetching of a page, said memory controller closes said page to cause a memory to shift into a power saving mode;

wherein the display buffer is provided according to a following number of memory units: (2+(data size of horizontal line of display device)/(page size of memory)+1), wherein the (data size of horizontal line of display device)>=(page size of memory).

* * * * *